United States Patent [19]

Rumph

[11] Patent Number: 5,275,487
[45] Date of Patent: Jan. 4, 1994

[54] HAZARDOUS WASTE TRANSPORTATION AND DISPOSAL

[75] Inventor: Robert M. Rumph, Sumter, S.C.

[73] Assignee: The Maitland Company, Inc., Sumter, S.C.

[21] Appl. No.: 939,424

[22] Filed: Sep. 4, 1992

Related U.S. Application Data

[63] Continuation of Ser. No. 622,104, Dec. 4, 1990, abandoned.

[51] Int. Cl.⁵ .................... B01F 15/02; B01F 7/04
[52] U.S. Cl. .................... 366/196; 366/61; 366/331; 366/14
[58] Field of Search ............ 366/61, 279, 194–

[56] References Cited

U.S. PATENT DOCUMENTS

| | | | |
|---|---|---|---|
| 155,212 | 7/1874 | White | 366/64 |
| 429,484 | 6/1890 | Schillinger . | |
| 510,545 | 12/1893 | McLennan . | |
| 539,288 | 5/1895 | McLennan | 366/285 |
| 912,125 | 2/1909 | Hassam . | |
| 1,192,478 | 7/1916 | Vandercock . | |
| 1,313,361 | 8/1919 | White . | |
| 1,872,622 | 8/1932 | Donahue . | |
| 1,896,616 | 2/1933 | Gillican | 366/194 |
| 1,915,757 | 6/1933 | Pierce . | |
| 2,108,416 | 2/1938 | Smith | 366/279 |
| 2,128,873 | 8/1938 | Roberts | 366/292 |
| 2,322,720 | 6/1943 | Scott | 366/194 |
| 2,411,138 | 11/1946 | Roberts | 366/195 |
| 2,872,166 | 2/1959 | Roberts | 366/145 |
| 2,891,675 | 6/1959 | Kaplon | 366/270 |
| 3,165,300 | 1/1965 | Balistrieri | 366/292 |
| 3,642,254 | 2/1972 | Ternes | 366/603 |
| 4,023,777 | 5/1977 | Kimmel | 366/292 |
| 4,082,227 | 4/1978 | McGrane | 366/195 |
| 4,157,872 | 6/1979 | Davido, Sr. . | |
| 4,187,029 | 2/1980 | Canale | 366/262 |
| 4,223,622 | 9/1980 | Mazzucato et al. . | |
| 4,298,289 | 11/1981 | Walley | 366/603 |
| 4,412,747 | 11/1983 | Moriyama . | |
| 4,464,259 | 8/1984 | Cramer | 366/286 |
| 4,542,992 | 9/1985 | Markhart . | |
| 4,552,460 | 11/1985 | Wallace . | |
| 4,599,004 | 7/1986 | Keith . | |
| 4,756,626 | 7/1988 | Neier | 366/279 |
| 4,944,600 | 7/1990 | McKelvey . | |
| 4,981,366 | 1/1991 | Wickoren | 366/262 |
| 5,005,364 | 4/1991 | Nelson | 366/262 |

FOREIGN PATENT DOCUMENTS

| | | | |
|---|---|---|---|
| 637579 | 4/1962 | Italy | 366/292 |
| 784525 | 10/1957 | United Kingdom | 366/196 |

Primary Examiner—Harvey C. Hornsby
Assistant Examiner—Randall E. Chin
Attorney, Agent, or Firm—Finnegan, Henderson, Farabow, Garrett & Dunner

[57] ABSTRACT

An apparatus for holding hazardous waste made up of solids and liquids in a flowable form includes a tank made of material selected to be impervious to and non-corrodible by the hazardous waste and having a non-critical portion, an agitator in the tank having fluid agitation portions oriented for rotational movement about a horizontal axis, a non-sparking motor located within the tank connected to the agitator for imparting rotation to the fluid agitation portions, and a power source for the motor outside the tank having means passing through the non-critical portion of the tank for communicating power from the power source to the motor. Thus, the power source may communicate power to the non-spark generating motor to impart rotation to the agitator to cause the fluid agitation portions to agitate hazardous waste made up of solids and liquids held in the tank to maintain the hazardous waste in flowable form. Preferably, the tank meets United States Department of Transportation Hazardous Waste transport standard MC 307.

19 Claims, 3 Drawing Sheets

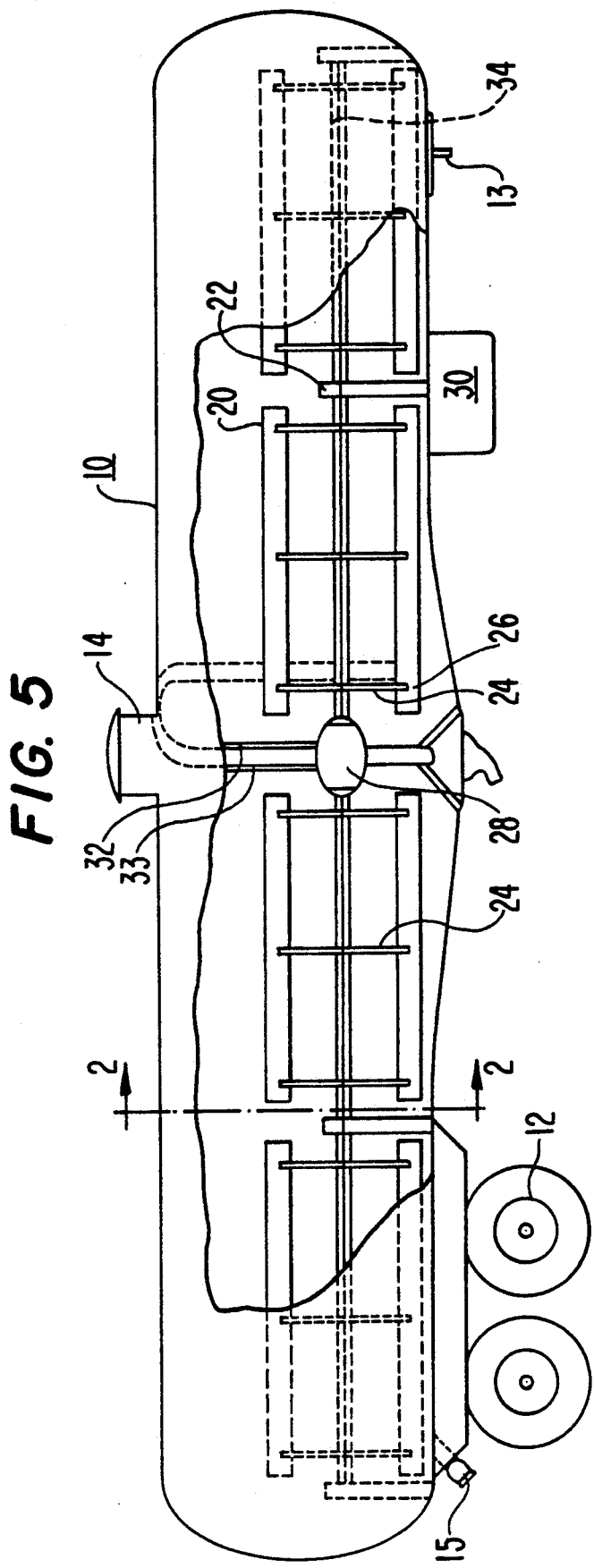

HAZARDOUS WASTE TRANSPORTATION AND DISPOSAL

This application is a continuation of application Ser. No. 07/622,104, filed Dec. 4, 1990, now abandoned.

BACKGROUND OF THE INVENTION

The present invention relates to a method and apparatus for the transportation of hazardous wastes in which the hazardous waste includes both solid and liquid components mixed together. The invention provides for thorough mixing of the solid and liquid components with numerous pertinent advantages.

As people and companies become more and more attuned to the appropriate disposition of hazardous waste, whether by personal desire or government regulation, the need arises for finding suitable ways of handling these wastes, so that the disposition can be effectuated safely and economically.

A particular class of hazardous waste has a high volatility and combustibility, making it dangerous to handle but useful as a fuel. An example of this type of waste is generated by the painting process. Leftover paints, paint thinners, paint solvents, and paint cleaning compositions are mixed together to yield a mixture which has these characteristics and which is toxic when released to the environment. An industry has arisen to use these paint-related wastes as fuel in industrial burners, most particularly in cement kilns. The kilns burn the solid and liquid waste as part of the burner fuel, and the ash residue of the combustion process serves as clinker in the cement. The high temperature in the kiln safely decomposes the various components of the paint-related residue to benign discharges. In addition, many of the solvent components of the waste are recyclable by removal from the waste by distillation. This reduces the volume of the waste, but increases the proportion of solids.

However, the kilns involved are located at some distance from the origin of the waste or the place of distillation, so a need arises to transport the waste to the kiln. Since the waste is highly combustible, transportation of the waste, by United States Department of Transportation regulations, must be in tank trucks having special construction. The applicable standard is Department of Transportation Hazardous Waste MC 307, which includes requiring that the empty tank not leak when subjected to an air pressure of 1.76 kilograins per square meter, so that the structural integrity of the tank must be substantial. Any breach of the wall of the tank requires retesting of the tank to its MC 307 rating. The entire text of the Department of Transportation MC 307 standard is incorporated herein by reference.

At the completion of the trip to the kiln, the discharge of the hazardous waste from the tank to the kiln burner or a holding tank at the kiln has previously been problematic. The liquid successfully drains from the tank, but a large quantity of the solids remain. Previous attempts to deal with this problem include providing drop centers or drop bellies in the tanks so that the bottom wall of the tank is sloping, and gravity assists in the discharge of solids along with the liquids. This design has met with only limited success.

The retention of solids in the bottom of the tank poses numerous disadvantages. First, the backhaul of the tank to pick up another load entails hauling the solids back to the pickup point, making the tank heavier and wasting fuel. Of course, the buildup of the solids reduces the capacity of the tank so that each subsequent refill of the tank includes less and less volume. Typically, two inches of solids were deposited in the bottom of the tank from each load prior to the use of the present invention.

Also, the solids have a high BTU level, so that they contribute to the fuel value of the hazardous waste when they are adequately discharged with the liquid. For them to remain deposited in the bottom of the tank diminishes the available fuel value of the waste.

Moreover, the proper operation of the kiln requires the proper mix of components in the hazardous waste when used a fuel, including maximum allowable levels of chloride and water, and other components. Not only are the solids capable of precipitating from the mixture, but some of the liquids in the mixture are not entirely miscible. These liquids can separate, causing the liquid as discharged from the tank to have different fuel values, depending on which portion of the tank is being drained at any given time. This can be disruptive to proper operation of the kiln or proper complete combustion of the waste so that the kiln's discharges fall outside of permissible or desired ranges. As a result, the kiln operator tests each load of waste and sometimes turns away a load found not to meet its specifications.

Some such tests have been erroneous in that only a certain fraction of the overall volume of hazardous waste was sampled because of the separation of components. Although the overall mixture in the tank may be within the parameters set by the kiln, the precise sample taken by the kiln tester may fall outside these parameters and result in rejection of the entire truckload.

Typically, the buildup of the solids in the bottom of the tank has been dealt with by having a workman enter the tank with a shovel to shovel the solids into barrels for processing. Such processing, rather than being a useful disposition of the solids as in burning in the kiln, constitutes underground storage or wasteful incineration. This does not, of course, solve the problems of incomplete mixing of liquids and is not a chore the workman typically enjoys. It is known that a previous attempt to agitate the contents of a hazardous waste transport tank included the use of vertically extending augers or the like, but it resulted in a considerable residue of solids in the tank after it was supposedly drained. While other types of tanks in which agitators are provided are known, such as concrete mixers and the like, none are designed for the hauling of hazardous waste under conditions meeting Department of Transportation MC 307 standards.

Thus, the settling of the contents of the tanks has posed numerous problems, which prior art attempts to rectify have not been successful in alleviating. Accordingly, there is a need in the art for a method and apparatus for agitating the hazardous waste solids and liquids to maintain them in flowable form so that they may be fully and usefully discharged from the tank.

SUMMARY OF THE INVENTION

The present invention fulfills this need in the art by providing an apparatus for holding hazardous waste made up of solids and liquids in a flowable form including a tank made of material selected to be impervious to and non-corrodible by the hazardous waste and having a non-critical portion, an agitator in the tank having fluid agitation portions oriented for rotational movement about a horizontal axis, a non-sparking motor located within the tank connected to the agitator for imparting rotation to the fluid agitation portions, and a power source for the motor outside the tank having means passing through the non-critical portion of the tank for communicating power from the power source to the motor. Thus, the power source may communicate power to the non-spark generating motor to impart rotation to the agitator to cause the fluid agitation portions to agitate hazardous waste made up of solids and liquids held in the tank to maintain the hazardous waste in flowable form.

Preferably, the agitator includes support elements for the fluid agitation portions located completely within the tank, and the support elements include bronze bearings in which the fluid agitation portions may rotate. Desirably, the tank has a central horizontal axis, and the horizontal axis about which the fluid agitation portions are oriented is parallel and substantially below the central horizontal axis. The fluid agitation portions include an array of axially extending blades. The blades extend at a slight angle to the axis of rotation so that upon rotation of the blades, the solids component of the hazardous waste is transported axially.

Preferably, the tank meets United States Department of Transportation Hazardous Waste transport standard MC 307. The tank is stainless steel, and the agitator is aluminum. The agitator may also be made of stainless steel or other suitable material.

In one embodiment, the tank has a rear discharge port and the blades transport the solids component to the rear discharge port. In another embodiment the tank has a drop center discharge port and the agitator includes a first set of blades aft of the discharge port and a second set of blades forward of the discharge port. The blades transport the solids components to the center discharge port. In this embodiment, the tank may have a forward floor portion slanted rearwardly forward of the discharge port and an aft floor portion slanted forwardly aft of the discharge port. Desirably, the first set of blades is oriented for rotation about an axis substantially parallel with the aft floor portion, and the second set of blades is oriented for rotation about an axis substantially parallel with the forward floor portion.

The non sparking motor may be a hydraulic motor, the power source a hydraulic fluid pump, and the means for communicating power a pair of hydraulic lines. The non-critical portion of the tank is a manway collar, and the hydraulic lines pass through the manway collar.

In one embodiment, the tank is mobile. In this embodiment the apparatus may include a truck or trailer body on which the tank is mounted. Alternatively, it may include a rail car body or a ship, barge or boat on which the tank is mounted.

In another embodiment (which may also be mobile) the tank has a plurality of compartments, and one of the agitators is located in each of the compartments. This permits a plurality of mixtures of hazardous waste to be held in the tank without mixing between the mixtures, but with each mixture held in a flowable form.

The invention also provides a method of transporting hazardous waste composed of solids and liquids including the steps of: depositing the hazardous waste in a United States Department of Transportation MC 307 rated tank, moving the tank of hazardous waste to a destination, agitating the hazardous waste to maintain the hazardous waste in substantially completely flowable form without appreciable solids deposition, and discharging the flowable hazardous waste to a suitable repository. The agitation step includes introducing rotational motion to the fluid about a horizontal axis. Desirably, but not necessarily, the agitation step occurs simultaneously with the moving step.

The invention also provides a method of maximizing the available fuel value of a combustible hazardous waste mixture of solids and liquids, each of the solids and liquids being independently combustible, including the steps of: holding the hazardous waste in a tank, agitating the hazardous waste while it is in the tank so that the solids and liquids are in the form of a flowable mixture of independently combustible solids and liquids, and discharging the flowable mixture of independently combustible solids and liquids from the tank to a burner for combustion, whereby both solids and liquids are available to the burner for combustion. In one embodiment this method also includes the step of providing paint residues, paint thinners, paint cleaning solvents or the distillation residue thereof as the combustible hazardous waste. The materials to be hauled may be various, including foods, petroleum distillates, oils and other materials.

BRIEF DESCRIPTION OF THE DRAWINGS

The invention will be better understood from a reading of the following detailed description of the preferred embodiments along with a study of the drawings in which.

DETAILED DESCRIPTION OF THE PREFERRED EMBODIMENTS

Figure 3:
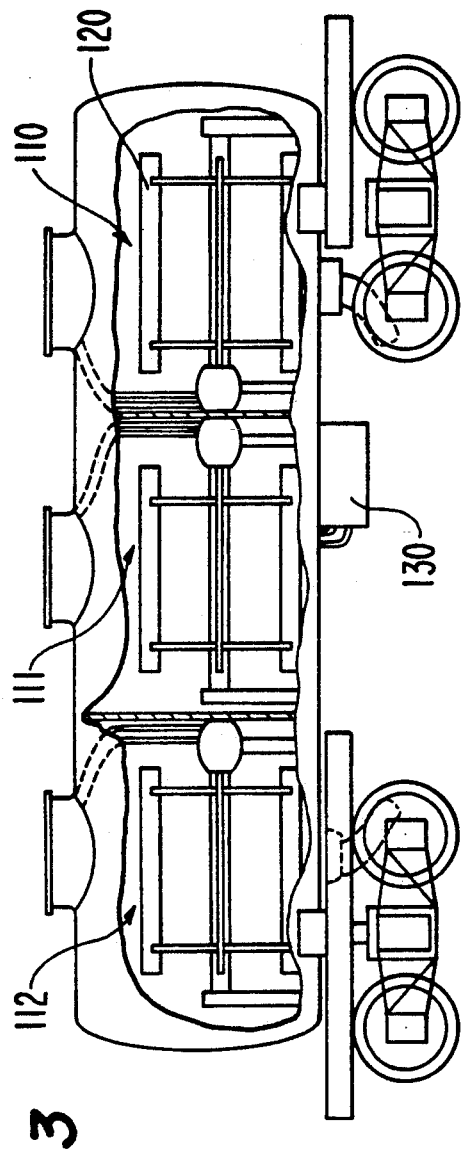
FIG. 3 is a schematic elevational and sectional view of the invention as embodied in a compartmented rail car.

The present invention relates to the agitation of hazardous wastes including solids and liquids to maintain them in flowable form and will be described in detail with reference to a particular trailer configuration as one embodiment. However, as will be appreciated, the invention can be used not only in trailers, but also trucks, rail cars (as in FIG. 3), ships, barges and boats (as in FIG. 4) and even in stationary tanks. In particular, the latter may be particularly valuable for a kiln or other installations where the mixture is to be held until used.

Figure 1:
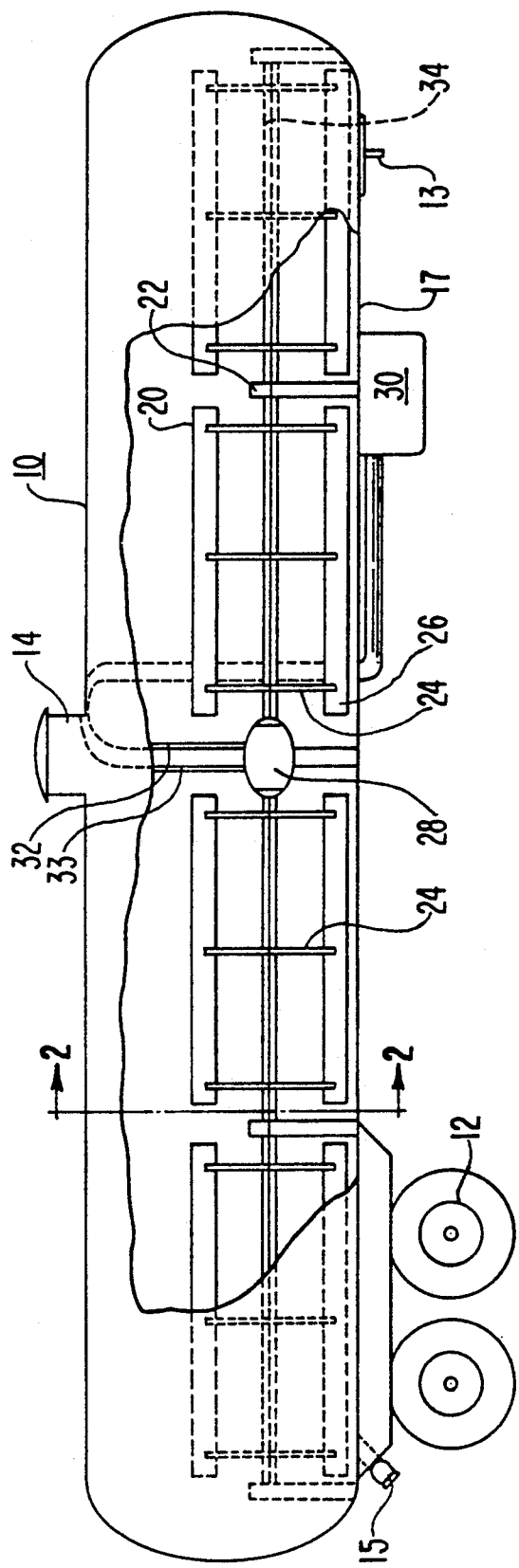
FIG. 1 is a side elevation view of apparatus according to one embodiment of the invention, partially broken away and partially shown in schematic form.

Referring to FIG. 1, a conventional tank trailer has been shown fitted with the invention. The trailer includes a tank 10, an undercarriage with wheels 12, and a pin 13. A manway collar 14 provides a hatchway access to the interior of the tank 10 and a rear discharge 15 is provided, all in conventional fashion. The tank 10 preferably meets the standards of the United States Department of Transportation Standard MC 307 for over-the-road hauling of hazardous waste. As such, it is made of 307 stainless steel, or better.

Disposed within the tank 10 is an agitator 20 which includes supports 22, shaft 34 and blades 26. The supports 22 can be arranged inside the tank in any suitable fashion, with the supports taking the form of posts welded to the floor of the tank as one suitable embodiment. The shaft 34 is arranged to pass through supports 22 in bronze bearings (not shown) and has affixed to it, again by any desired construction, radial arms 24 which in turn have axially extending blades 26 affixed thereto. Preferably, the supports, shafts, radial arms and blades are all made of aluminum to keep the weight of the apparatus as low as possible. In the embodiment shown in FIG. 1, four axially disposed arrays of blades 26 are provided, but other arrangements of blades may be substituted. In particular, with a central manway collar 14 as shown in FIG. 1, one long set of blades can be mounted fore and another aft of the hydraulic motor 28.

In the embodiment depicted in FIG. 1, a single hydraulic motor 28 is provided driving the shaft 34. In a more preferred embodiment, two hydraulic motors are provided, one driving the forward sets of blades and the other driving the rearward sets of blades. This permits the blades to be driven in either the same or opposite directions as may be desired to achieve thorough agitation of the solids and liquids in the tank or to transport the solids and liquids, as will be discussed more later.

A hydraulic power unit 30 is provided on the outside bottom of the tank and includes a 13 horsepower diesel engine driving a hydraulic pump and a hydraulic fluid reservoir. A hydraulic line 32 extends from the hydraulic pump up the outside of tank 10, sealingly passes through the manway collar 14, and extends down inside the tank 10 to the hydraulic motor 28. A similar return line 33 is also provided, similarly located. As will be appreciated, the connection through the manway collar 14 is made to be fluid-tight, but the stresses imposed upon the manway collar are not as great as those on the main body of the tank, so that such breach does not compromise the integrity of the tank for purposes of meeting the Department of Transportation's MC 307 standard. Thus the manway collar is a non-critical portion of the tank. Other tanks may have other non-critical portions.

As can be seen in FIG. 1, the blades are mounted on radial arms 24 so as to clear the bottom of the tank by a comfortable margin, typically about an inch. Even with that much clearance, the turbulence caused by the rotation of the blades prevents any collection of solids on the bottom of the tank. In addition, the spacing provides for the possibility of wear on the bronze bearings over time so that the blades 26 can gradually lower towards the floor without interference.

The environment inside the tank is quite harsh, and the components are subject to wear, particularly the bearings and the seals. While expensive hydraulic motor seals selected for compatibility with the mixture to be hauled may be used if desired, it has been found that such seals are not cost effective. Leakage of hydraulic fluid from the motor 28 inside the tank merely causes the discharge of the hydraulic fluid into the waste material without deleterious effect on either the waste material or the hydraulic system. The fluid loss can be easily detected by loss of fluid from the hydraulic reservoir on the hydraulic power unit 30, and the fluid lost can be easily and inexpensively replaced. There is no danger of waste material entering or fouling the hydraulic system because the pressure difference between the hydraulic line and the waste material prevents passage of waste material into the hydraulic system.

Figure 2:
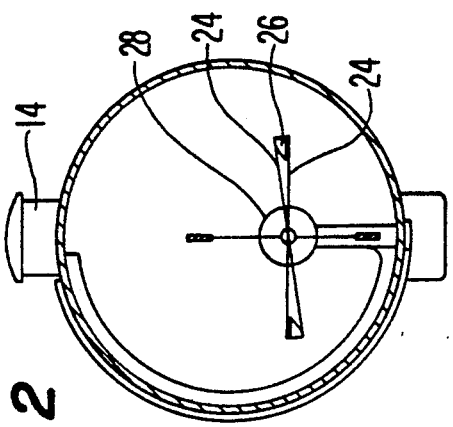
FIG. 2 is a schematic sectional view taken along lines 2—2 in FIG. 1 and looking in the direction of the arrows.

As can be seen in FIG. 2, the blades 26 are inclined to the shaft 34 at a slight angle, typically about 6 degrees. That is, the sets of radial arms 24 are rotate with respect to fore and aft sets of radial arms so that the affixation of the blades 26 top the arms 24 inclines the blades 26. The effect of the angle of the blade is to impart a slight axial as well as rotational motion to the solids, so that the solids are transported axially. This feature can be used to advantage to transport the solids toward the discharge 15 of the tank.

The location of the discharge port on a given tank may indicate the most advantageous arrangement of blades and their angles. The hydraulic motor 28 is typically operable in either direction by reversal of the hydraulic fluid pressure in lines 32,33 so that the axial transport of solids can be reversed if desired. As can be appreciated from either drawing figure, the shaft 34 forming the axis of rotation of the agitator is at a level below the axis of the entire tank. This has been found to provide very good mixing in that the solids and liquids are not only brought up from the bottom of the tank, but sheared into the upper layers, which are, in turn, pulled down by the downward motion of the blades on their return paths.

The mounting of the apparatus including supports, shaft, agitator and motor all entirely within the tank 10 means that there are no breaches in the structural integrity of the tank 10 other than the unimportant entrances of the hydraulic line through the manway collar 10. This ensures that leakage of the hazardous waste through a failed bearing or seal cannot take place.

In operation, the tank 10 is loaded with the solids and liquid mixture through the manway collar 14. The tank sets off for its destination with the hydraulic power unit 30 turned on, providing hydraulic fluid under pressure through hydraulic lines 32,33 to drive hydraulic motor 28 and thereby rotate the agitator 20.

As the tank is taken to the kiln, the rotation of the blades 26 gradually causes the solids accumulation to increase towards the rear of the tank, although the entire solids and liquid mixture is kept in a flowable form without appreciable deposit on the floor of tank 10. Upon arrival at the kiln, the tank can remain parked for an extended period of time with the solids and liquids maintained in a flowable form by continued operation of the agitator. This can be helpful if the truck must wait its turn to unload. Then the tank 10 is connected to the burner intake through its rear discharge 15 in conventional fashion, while the agitator 20 continues to run. The tank is completely drained of solids and liquids passing through the discharge 15. If desired, the tank can be pressurized with air pressure applied through manway collar 14 or another fitting to speed up the discharge, but that is not necessary.

Alternatively, the solids and liquids can be deposited into the tank without the agitator in operation, and the solids can be allowed to settle to the bottom. Then, the agitator can be started so the solids and liquids mixture will be fluidized for discharge. If the solids contents is great, it may be necessary to waggle the agitator to and fro to loosen the solids to permit full rotation to begin. Continued rotation thereafter will maintain the solids and liquids in flowable form.

Figure 5:
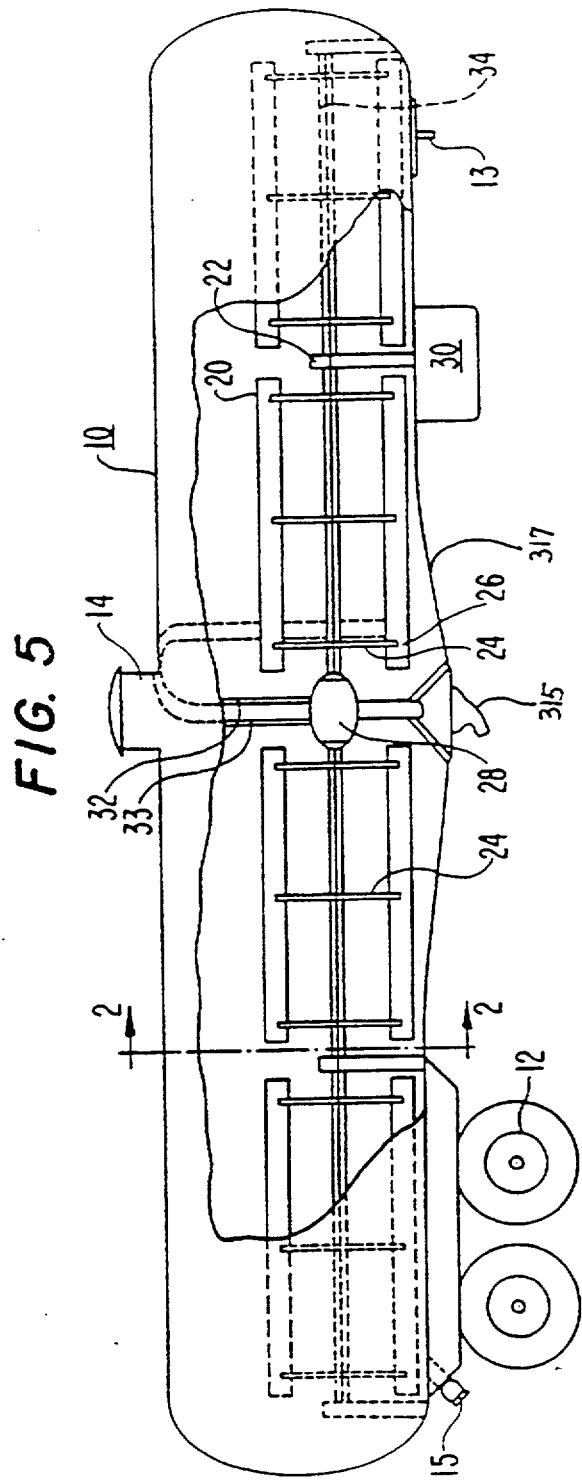
FIG. 5 is a sectional view of apparatus according to an embodiment of the invention incorporating in a drop center bottom tanker.

The apparatus may be installed in level center discharge, drop center or drop belly tanks known to the art. An example of a drop body tank with a drop center discharge port 315 in tank bottom 317 is illustrated in FIG. 5. This will assist in assuring movement of the solids and liquids to the center discharge. Preferably, in such a tank, agitators are provided fore and aft of the discharge port. Each is rotatable about an axis of rotation parallel with the floor of the portion of the tank in which the agitator is installed. Thus, the axes of rotation will not be parallel to one another.

In addition, agitators can be provided in known compartmented tanks so that each compartment receives its own mixture and is maintained in a flowable state. This can be seen in the embodiment depicted in FIG. 3 in which the invention is installed in a compartmented rail car. Each compartment 110, 111, 112 is supplied with its own manway collar, agitator 120 and discharge port. A single hydraulic pump 130 may be provided, along with control valves (not shown) suitable for selectively operating the agitators as desired.

Figure 4:
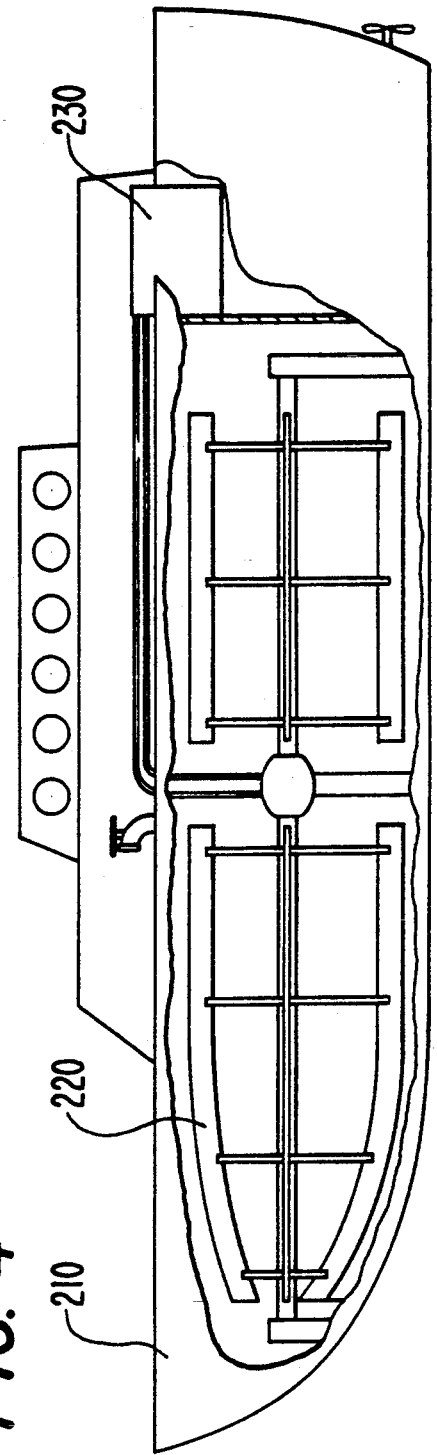
FIG. 4 is a schematic view of the invention as embodied in a boat.

In the embodiment of FIG. 4, the tank 210 is provided with an agitator 220 tapered to conform to the boat hull. The other components including a non-sparking motor and power supply therefor 230 are provided, analogously to those described with reference to FIG. 1.

The thorough mixing that the solids and liquids are given by the present invention not only assures that the tank will be completely drained when desired, but the usefulness of the hazardous waste as a combustible fuel is increased in several ways. First, the effective fuel value of the waste is increased because of the higher BTU content of the solids than the liquids. Since the solids are being more completely discharged and used as the fuel, the effective BTU rating of the fuel increases. Furthermore, since the solids and liquids are mixed together, the liquid when used as a fuel is more homogeneous, so it gives more consistent burning properties and results in more uniform ash, which is distributed in the cement as clinker. Finally, when the kiln operator samples the waste to test it, a more accurate reading of the components of the waste is obtained since it is a more homogeneous mixture. That is, components have not separated from one another by settling. The owner of the tank gets full use of his or her tank when equipped with the apparatus of the present invention since the finite volume of the tank does not diminish with time due to the buildup of solids. Also, in a mobile tank, the fuel consumption of the truck, tractor or the like on the backhaul is reduced since no dead load is carried.

But perhaps the most important contribution of this invention is the way that it permits the solids to be used as useful fuel, rather than being buried for posterity or being burned in a waste incinerator where the fuel value is minimal. Last but not least, the worker who's no longer asked to enter a tank to shovel this solid material appreciates this invention, too.

Although the invention lids been described with respect to specific embodiments, various other applications of the invention will come to those of ordinary skill in the art, and the invention should not be deemed to be limited to the embodiments described herein.

What is claimed is:

1. An apparatus for containing a load of hazardous substances including liquids and solids, a top surface of the load defining a load level, the apparatus comprising:
  a closed tank for containing the load of hazardous substances and including a tank bottom and opposing side walls, said tank having a top portion, a manhole opening located in the top portion, and a valved opening located in the bottom
  agitating means located in the tank and extending between the side walls for agitating substances within the tank to prevent the solids from settling on the bottom of the tank, the agitating means including a shaft rotatably mounted in the tank, extending substantially parallel to the tank bottom and having first and second distal shaft ends, said side walls of the tank being imperforate in areas adjacent the first and second distal shaft ends;
  means located in said tank for supporting said shaft such that the entire agitating means, including the first and second distal shaft ends, is completely contained and supported within the interior of the tank;
  a non-sparking motor for rotating the shaft, the motor being located within the tank beneath the load level and being submerged in at least a portion of the hazardous substances when the tank is loaded; and
  means for transmitting power to the non-sparking motor.

2. An apparatus as claimed in claim 1 wherein said means for supporting includes support elements located within the tank, the support elements for engaging the shaft.

3. An apparatus as claimed in claim 2 wherein said support elements include bronze bearings in which said shaft may rotate.

4. An apparatus as claimed in claim 1 wherein said tank has a central horizontal axis, the shaft being located parallel to and substantially below said central horizontal axis.

5. An apparatus as claimed in claim 1 wherein said tank is stainless steel and said agitating means include aluminum.

6. An apparatus as claimed in claim 1 wherein said agitating means includes an array of blades and the shaft includes a substantially horizontal axis, the blades extending substantially parallel to the horizontal axis of the shaft.

7. An apparatus as claimed in claim 6 wherein said tank has a rear discharge port and said blades transport the solids component to said rear discharge port.

8. An apparatus as claimed in claim 1 wherein said tank has a drop center discharge port and said agitating means includes a first set of blades aft of said discharge port and a second set of blades forward of said discharge port, said blades for transporting hazardous waste to said center discharge port.

9. An apparatus as claimed in claim 8 wherein said tank has a forward floor portion located forward of said discharge port and slanted rearwardly, and an aft floor portion located aft of said discharge port and slanted forwardly.

10. An apparatus as claimed in claim 9 wherein said first set of blades is oriented for rotation about an axis substantially parallel to the aft floor portion and said second set of blades is oriented for rotation about an axis substantially parallel to the forward floor portion.

11. An apparatus as claimed in claim 1 wherein said non-sparking motor is a hydraulic motor and said means for transmitting power includes a hydraulic fluid pump and a pair of hydraulic lines, the hydraulic lines connecting the pump to the motor.

12. An apparatus as claimed in claim 11 wherein the manhole opening includes a manway collar and said hydraulic lines pass through said manway collar.

13. An apparatus as claimed in claim 1 wherein said tank is mobile.

14. An apparatus as claimed in claim 13 further comprising a truck or trailer body on which said tank is mounted.

15. An apparatus as claimed in claim 13 further comprising a rail car body on which said tank is mounted.

16. An apparatus as claimed in claim 13 further comprising a ship or boat on which said tank is mounted.

17. An apparatus as claimed in claim 1 wherein the tank includes a plurality of isolated compartments and the agitating means includes a plurality of agitators one of said agitators being located in each of said compartments.

18. An apparatus as claimed in claim 1 wherein the shaft extends substantially along an entire length of the tank bottom.

19. An apparatus for transporting a hazardous substance, the apparatus comprising:

an elongated closed tank having a tubular outer wall with opposing distal ends, said tank having a bottom portion and a top portion, a manhole opening located in the top portion, and a valved opening located in the bottom portion;

a pair of opposing imperforate side walls, each side wall being located on an opposing distal end of the tubular tank wall;

elongated agitation means mounted within the tank and extending substantially along the entire length of the elongated tank between the side walls for agitating substances within the tank, said elongated agitation means having first and second distal ends;

means located within the tank for supporting said agitation means, each of the distal ends of the agitation means being spaced from an adjacent side wall of the tank such that the entire agitation means, including the first and second distal ends, is completely contained and supported within the interior of the tank;

a non-sparking motor for rotating the agitation means, the motor being located within the tank and being submerged in the hazardous substance when the tank is loaded; and means for transmitting power to the non-sparking motor.

* * * * *

UNITED STATES PATENT AND TRADEMARK OFFICE
CERTIFICATE OF CORRECTION

PATENT NO. : 5,275,487
DATED : Jan. 4, 1994
INVENTOR(S) : Robert M. Rumph

It is certified that error appears in the above-indentified patent and that said Letters Patent is hereby corrected as shown below:

The drawing sheet consisting of Fig. 5, should be deleted to be replaced with the drawing sheet, consisting of Fig. 5, as shown on the attached page.

Signed and Sealed this

Eighth Day of November, 1994

Attest:

BRUCE LEHMAN

Attesting Officer

Commissioner of Patents and Trademarks